Figure 4:
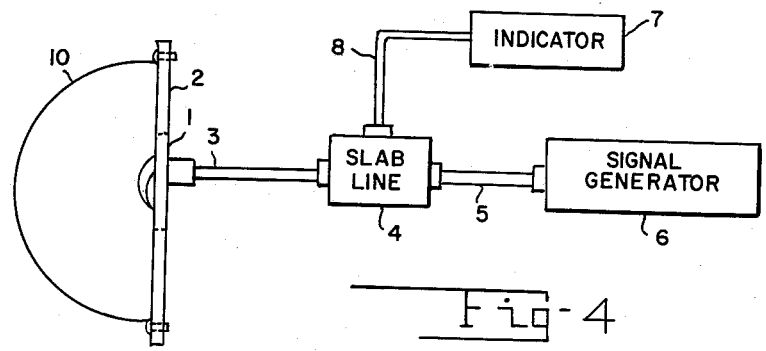

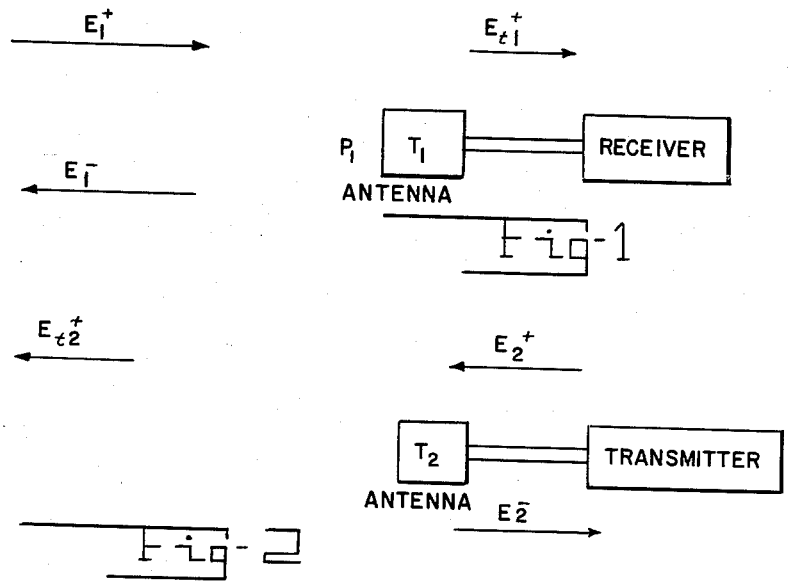
Fig-1
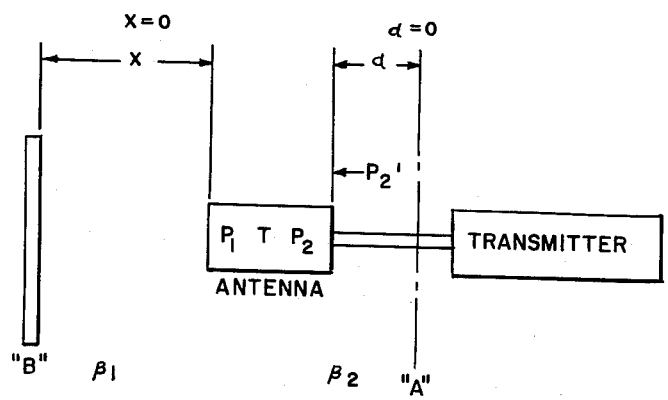
Fig-2
Fig-3
INVENTORS
WILLIAM P. TURNER
CARL F. ARANTZ JR.

Oct. 9, 1962

W. P. TURNER ETAL 3,058,108

MEASUREMENT OF EFFICIENCY OF SMALL
LINEARLY POLARIZED ANTENNAS

Filed March 14, 1961

2 Sheets-Sheet 2

INVENTORS
WILLIAM P. TURNER
CARL F. ARANTZ JR.
BY
ATTORNEYS

United States Patent Office 3,058,108
Patented Oct. 9, 1962

3,058,108
MEASUREMENT OF EFFICIENCY OF SMALL LINEARLY POLARIZED ANTENNAS
William P. Turner, New Orleans, La., and Carl F. Arantz, Jr., Decatur, Ala., assignors to the United States of America as represented by the Secretary of the Air Force
Filed Mar. 14, 1961, Ser. No. 95,751
2 Claims. (Cl. 343—100)
(Granted under Title 35, U.S. Code (1952), sec. 266)

The invention described herein may be manufactured and used by or for the United States Government for governmental purposes without payment to use of any royalty thereon.

The invention relates to techniques for determining antenna efficiency and, more particularly, to a technique for determining the efficiency of linearly polarized antennas by measuring the amplitude and phase of reflection coefficients.

Little attention has been devoted to the quantitative analysis of measuring techniques for obtaining antenna efficiency. The loss in the antenna is usually assumed to be negligible and an awkward measurement is thereby avoided. Where specific procedures for measuring antenna efficiency are discussed quantitatively in the literature, it is evident that the methods used are either quite tedious and time consuming or else involve extremely complicated and specialized equipment.

In the field of electronic countermeasures, and the field of aircraft communication in general, the trend has been toward higher and higher frequencies and smaller and smaller, broad-banded flush-mounted, and semi-flush-mounted antennas. The loss in such antennas can be high, particularly if the antenna matching section is considered an integral part of the antenna itself. The losses in such antennas become extremely important, both from a design and an operating point of view, and can no longer be safely neglected.

The efficiency of an antenna is defined as the ratio of the power radiated by the antenna to the power input to the antenna. Commutatively, this may be expressed as: power radiated+power lost=power input.

It is convenient to divide the total power lost into two parts; the loss $L_r$, due to reflection or mismatch of the antenna; and $L_d$, the power loss due to dissipation within the metal and dielectric parts of the antenna itself. The power loss $L_r$, due to reflection, may easily be determined by conventional reflection coefficient methods and is not considered in the presence efficiency method. The power loss $L_d$, due to dissipation is the parameter of interest. The efficiency with which the method of this invention is concerned, therefore, is defined as the transmission efficiency or the ratio of power radiated by the antenna to the power input to the antenna terminals. Since ultrahigh-frequency antennas and their matching sections are generally fabricated together, it is difficult to consider them separately due to the lack of definitive terminals. Therefore, the antenna and its matching section is defined as the joint between the antenna matching section and the line that feeds it. $L_d$ includes dissipation within the matching section.

The novel method of measuring antenna efficiency proposed by this invention employs a reflection system. A series of hemispherical metal enclosures when attached to the ground plane of an antena testing stand serve to reflect the outgoing wave radiated by the antenna. The phase and magnitude of the reflections depend upon the radii of the hemispheres. By measuring the amplitude and phase of the reflection coefficients using slotted-line measuring techniques, values are obtained which produce a circular locus in the complex plane. The radius of this locus equals the transmission efficiency of the antenna under test.

An object of this invention is to provide a simple and rapid method of measuring antenna efficiency.

Another object of this invention is to provide a method for determining the efficiency of small linearly polarized antennas which is simple and rapid, employs a minimum of special equipment, and is capable of a high order of accuracy.

The nature of the invention, further objects, and advantages will appear more fully upon consideration of the embodiments illustrated in the accompanying drawing and hereinafter to be described.

Figure 5:
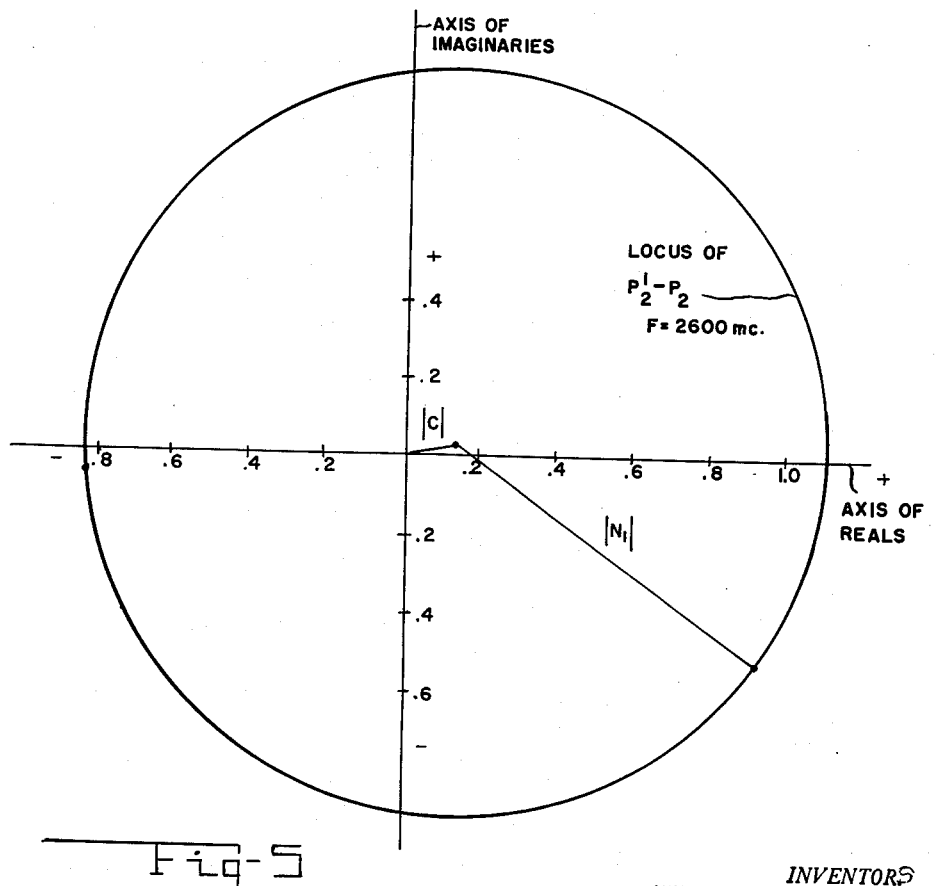

In the drawing:
FIGURE 1 is a schematic illustration of an antenna receiving a linearly polarized wave which is being propagated through free space;
FIGURE 2 is a schematic illustration of the transmission of linear polarized waves from an antenna;
FIGURE 3 is a schematic illustration showing the FIGURE 2 situation with the addition of a reflecting surface located at a distance from the antenna;
FIGURE 4 is a schematic drawing of the apparatus necessary for the measurement of antenna efficiency; and,
FIGURE 5 shows a typical plot of $P_2'-P_2$ in the complex plane for a frequency of 2600 mc.

THEORETICAL DEVELOPMENT

During the course of this development, complex quantities will be denoted by capital letters and real quantities by double bars. For example, complex field intensity E or magnitude of reflection coefficient $|P|$.

The antenna depicted in FIGURE 1, acting as a receiving antenna, is receiving a linearly polarized wave which is being propagated through free space. This wave reaches the antenna with field intensity $E_1^+$. Due to antenna mismatch, $E_1^-$ is the field intensity of the reflected wave and $$P_1 = \frac{E_1^-}{E_1^+}$$

is the reflection coefficient looking into the antenna as a receiving antenna. $E_{t1}^+$ is the field intensity of the received wave as it emerges from the antenna terminals and $$T_1 = \frac{E_{t1}^+}{E_1^+}$$

represents the transmission cofficient (or receiving coefficient) of the antenna. It is assumed that the internal impedance of the receiver is matched to the line connecting the antenna and the receiver so there is no reflected wave of intensity $E_{t1}^-$. The following relations are now true:

$$E_1^- = P_1 E_1^+ \quad (1)$$
$$E_{t1}^+ = T_1 E_1^+ \quad (2)$$

Assume $E_1^+$ carries unit power; that is, $|E_1^+|^2 = 1$. Then from Equation 1 the power in the reflected wave is $|E_1^-|^2 = |P_1|^2$. Therefore the net power input, $$|E_1^+|^2 - |E_1^-|^2 = 1 - |P_1|^2$$

and the power output is, from Equation 2, $$|E_{t1}^+|^2 = |T_1|^2$$

The efficiency is $$|N_1| = \frac{\text{power out}}{\text{power in}} = \frac{|T_1|^2}{1 - |P_1|^2} \quad (3)$$

The Rayleigh-Helmholtz reciprocity theorem may be generalized to include radiating systems. The practical advantage of this theorem is that no distinction has to be made between the receiving and transmitting functions of an antenna provided the medium is linear, homogeneous, and isotropic. Since the transmitting and receiving properties of an antenna can be considered identical when the conditions of the reciprocity theorem are fulfilled, consider now the antenna of FIGURE 1 in the situation depicted in FIGURE 2.

The transmitter in FIGURE 2 is stipulated to be operating at the same frequency as the receiver referred to in FIGURE 1. The wave sent forward by the transmitter has field intensity $E_2^+$ at the antenna terminals. $E_2^-$ is the field intensity of the reflected wave and is again due to antenna mismatch. $E_{t2}^+$ is the intensity of the transmitted wave as it emerges from the antenna. There is no reflected wave of field intensity $E_{t2}^-$ since the antenna is radiating into infinite free space.

$$P_2 = \frac{E_{2-}}{E_{2+}}$$

is the reflection coefficient at the antenna terminals when looking at the antenna from the transmitter and $$T_2 = \frac{E_{t2}}{E_{2+}}$$

is the transmission coefficient employing the same reasoning used to derive the expression for the efficiency of the receiving antenna in FIGURE 1, the efficiency of the transmitting antenna of FIGURE 2 can be shown to be $$|N_2| = \frac{\text{power out}}{\text{power in}} = \frac{|T_2|^2}{1 - |P_2|^2} \quad (4)$$

The situation shown in FIGURE 3 is identical to the situation depicted in FIGURE 2 with the exception of the addition of a reflecting surface located distance "x" from the antenna. It is now assumed that the reflecting surface reflects all wave energy radiated by the antenna and that all reflected energy is in turn, received by the antenna in accordance with the reciprocity theorem.

In FIGURE 3, $P_1$ is the reflection coefficient looking toward the antenna as a receiving antenna and is identical to the reflection coefficient $P_1$ in FIGURE 1. $P_2$ is the reflection toward the antenna from the transmitter when the antenna is radiating into infinite free space and is identical to the reflection coefficient depicted in FIGURE 2. T represents the transmission coefficient. Since the antenna is a linear bilateral network, the reciprocity theorem shows that T is the same for both directions of propagation through the antenna. That is, T is identical to $T_1$ in FIGURE 1 and $T_2$ in FIGURE 2. This relation is also true for the complex reflection coefficients $P_1$ and $P_2$ as will be brought out later in this development. $\beta_1$ and $\beta_2$ represent the phase constants of free space and the antenna feed line respectively. $P_2'$ is the reflection coefficient seen at the junction of the line and the antenna terminals as modified by the reflecting surface. The modified reflection coefficient, $P_2'$ will now be calculated.

In deriving the expression for the modified reflection coefficient, the total field at point "A," an arbitrary point in the antenna feeder line (for example: the position of a slotted-line measuring section) will be computed. Since the reflecting surface at "B" imposes the boundary condition that the total field at "B" must be zero, it is convenient to compute the total fields at "A" and "B" when no reflection occurs at these points, apply the boundary condition, and combine the results using the superposition theorem.

Assume the reflecting surface at "B" in FIGURE 3 is replaced by a nonreflecting surface. The situation in FIGURE 2 represents this condition. Consider the fields at "A" and "B" caused by a wave from the right from the transmitter whose value at $d=0$ is $E_2^+$. These fields may be described mathematically as follows:

$$E_A' = E_2^+ \epsilon^{+j\beta_2 d} + E_2^- \epsilon^{-j\beta_2 d} = E_2^+ (\epsilon^{+j\beta_2 d} + P_2 \epsilon^{-j\beta_2 d}) \quad (5)$$
$$E_B' = T E_2^+ \epsilon^{-j\beta_1 x} \quad (6)$$

Now consider the fields at "A" and "B" with a wave incident on the antenna when it is acting as a receiving antenna. The wave is incident from the left and has the value $E_1^+$ at $x=0$.

$$E_A'' = T E_1 + \epsilon^{-j\beta_2 d} \quad (7)$$
$$E_B'' = E_1^+ \epsilon^{+j\beta_1 x} + E_1^- \epsilon^{-\beta_1 x} = E_1^+ (\epsilon^{+j\beta_1 x} + P_1 \epsilon^{-j\beta_1 x}) \quad (8)$$

The internal impedance of the transmitter (acting as a receiver in this case) is matched to the line which feeds the antenna. This represents a nonreflecting termination and is described by the situation in FIGURE 1.

From the superposition theorem it is known that if $E_A'$ and $E_B'$ represent a solution to Maxwell's equations for specified boundary conditions and $E_A''$ and $E_B''$ represents another solution subject to the same boundary conditions, then any linear combination of the fields must also satisfy Maxwell's equations. Therefore, Equations 5 and 7 and Equations 6 and 8 and particularly their sums are a solution which represents a condition of operation of the system and therefore an appropriate standing wave pattern. Denoting the total fields at "A" and "B" by $E_A$ and $E_B$, they can be written:

$$E_A = E_A' + E_A'' \quad (9)$$
$$E_B = E_B' + E_B'' \quad (10)$$

Since total reflection occurs at "B," the boundary condition $E_B=0$ is imposed. With this boundary condition fulfilled, substitution of Equations 6 and 8 into Equation 10 gives for $E_1^+$ and $E_2^+$ $$E_1^+ = -\frac{T E_2^+}{\epsilon^{+j2\beta_1 x} + P_1} \quad (11)$$

Substituting Equation 11 into Equation 7 gives $$E_A'' = \frac{-T^2 E_2^+ \epsilon^{+j\beta_2 d}}{\epsilon^{+j2\beta_1 x} + P_1} \quad (12)$$

Combining Equation 12 with Equation 5 and 9 gives the total field $E_A$ at point "A" as $$E_A = E_2^+ \left[ \epsilon^{+j\beta_2 d} + P_2 \epsilon^{-j\beta_2 d} - \frac{T^2 \epsilon^{-j\beta_2 d}}{\epsilon^{+j2\beta_1 x} + P_1} \right] \quad (13)$$

This equation can be rewritten in the form of Equation 5 as $$E_A = E_2^+ [\epsilon^{+j\mu_2 d} + P_2' \epsilon^{-j\beta_2 d}] \quad (14)$$

where $$P_2' = P_2 - \frac{T^2}{\epsilon^{+j2\beta_1 x} + P_1} \quad (15)$$

It can be seen from Equation 14 that $P_2'$ represents the modified reflection coefficient shown in FIG. 5 for any position "X," of the reflecting surface.

Equation 15 may be rewritten in the form $$\frac{1}{P_2' - P_2} = -\frac{P_1}{T^2} - \frac{\epsilon^{+j2\beta_1 x}}{T^2} \quad (16)$$

The locus of $$\frac{1}{P_2' - P_2}$$

describes a circle in the complex plane as $x$ varies. The circle has a radius of $$\left| \frac{1}{T^2} \right|$$

with its center located at $$\frac{-P_1}{T^2}$$

Therefor, measurements of $P_2$, the reflection coefficient modified by the hemispherical shells, when plotted in conjunction with $P_2$, the constant reflection coefficient produced by the antenna when radiating into free space, are sufficient to determine values of $|T|$ and $|P_1|$. These values, when substituted into Equation 3 will determine the efficiency $|N_1|$ looking into the antenna as a receiving antenna. Because of the antenna reciprocity theorem, the antenna transmits as well as it receives and the transmitting and receiving efficiencies and reflection coefficients should be identical. That is, $P_1 = P_2$ and $|N_1| = |N_2|$. This provides an excellent check on the validity of this development as will be shown in the experimental results below.

By use of the transformal properties of the function $$w = \frac{1}{z}$$

Equation 16 can be inverted to obtain a much more convenient form to plot in the complex plane. If $$\frac{1}{P_2' - P_2}$$

is inverted then $P_2' - P_2$ describes a circle in the complex plane of radius $|R|$ with center at C where $$|R| = \frac{|T|^2}{1 - |P_1|^2} \quad (17)$$

$$C = \frac{T^2}{P_1} \frac{|P_1|^2}{1 - |P_1|^2} \quad (18)$$

Comparing Equation 17 with Equation 3 it can be seen that the radius $|R|$ now represents directly the efficiency $|N_1|$.

To completely utilize the advantage of the transformation $$w = \frac{1}{z}$$

it is sufficient to plot $P_2'$ in the complex plane since the constant $P_2$ does not affect the radius of the circle, but only the position of its center. The measured reflection coefficient $P_2$ will be reserved as a useful check on the accuracy of the experimental results.

The value of the radius and therefore the efficiency can be calculated directly from the minimum and maximum values of the voltage standing wave ratio, VSWR, when changing the distance $x$ of the reflecting surface, since the magnitude of the reflection coefficient is determined from the relationship $$|P_2'| = \frac{VSWR - 1}{VSWR + 1}$$

That is, $$|N| = \frac{|P \max.| + |P \min.|}{2}$$

$$= \frac{VSWR \max. \; VSWR \min. - 1}{(VSWR \max. + 1)(VSWR \min. + 1)} \quad (19)$$

$$|N| = \frac{|P \max.| - |P \min.|}{2}$$

$$= \frac{VSWR \max. - VSWR \min.}{(VSWR \max. + 1)(VSWR \min. + 1)} \quad (20)$$

Equation 19 applies if the circle inclosed the origin, and Equation 20 applies if the circle does not inclose the origin.

EFFICIENCY MEASUREMENT

The FIGURE 4 illustrates diagrammatically the measuring set up employed in obtaining efficiency measurements. The antenna 1 is mounted on a metal base plate 2 which, in turn, is attached to a test stand ground plane. A transmission line 3 connects the input of the antenna to a slab line 4, such as, Hewlett-Packard Model 805A which is suitable for measurements in the frequency range of 500 to 4000 mc. The slab line 4 is connected by transmission line 5 to signal generator 6 capable of energizing the antenna under test. A standing wave amplifier indicator 7 is connected to the slab line 4 by transmission line 8. Type 275 standing wave amplifier manufactured by Polytechnic Research and Development Company may be used as the indicator in the measurement set up.

A totally reflecting surface 10 in the shape of a hemispherical shell is centered on the test antenna 1 to obtain optimum reflection to the focal point, and bolted to the antenna mounting plate 2. At least three in number of these shells of different radii are required for the efficiency measurement. These shells are shaped by spinning and accurately spun to ±⅛ inch in diameter. Aluminum is the preferred material since it is readily available and an excellent conductor. The final thickness after spinning should be approximately 1 mm.

Briefly, the antenna efficiency determination is initiated by energizing the antenna 1 through the transmission lines 3 and 5 by signal generator 6. The VSWR is determined for each of the several totally reflecting surfaces of different radii centered on the antenna and for the condition in which the antenna is radiating into free space. The phase of the reflection coefficient is then determined in the conventional manner by shorting the slab line 4 at the input terminals of the antenna and noting the position of the minimum and relating the position of this point to the position of the minimum without short, thus giving $d$ the distance from load to minimum value of standing wave. The wave length $\lambda$ in the transmission line may be conventionally determined with the antenna radiating into free space. The reflection coefficient $P_2$ for the free space condition and the modified reflection coefficient $P_2'$ for each of the free totally reflecting surfaces may then be readily obtained from the formula:

$$P_2' = \frac{VSWR - 1}{VSWR + 1} \bigg/ \frac{4\pi d}{\lambda} \pm \pi \quad (21)$$

The use of the indicator 7 in the conventional manner is precluded where very high VSWR's are encountered (above 60) because of the radical departure of the slab line crystal detector from its square law properties. The conventional double-minimum method, which makes use of the fact that the curve of the standing wave envelope near a very low minimum approximates a parabola, may be used to obtain the VSWR. The experiment below utilizes this double-minimum method to determine the VSWR under the condition of total reflection.

The difference between each of said modified reflection coefficients $P_2'$ and the reflection coefficient $P_2$ gives the coordinates of three points in the complex plane which points produce a circular locus. These points are plotted and the radius of the circle determined. The radius is then equal to the efficiency of the antenna.

EXPERIMENTAL RESULTS

Measurements were taken on a scimitar antenna in 100 mc. increments from 2000 to 2600 mc. This frequency range was chosen because the free space wave length, approximately 12 to 15 centimeters, places the reflecting surfaces (radii 33–38 cm.) out of the Fresnel region and into the Fraunhofer region. The small frequency increment was chosen in order to verify measurements since it was not anticipated that the efficiency would change greatly over the chosen frequency band.

At each frequency the complex reflection coefficient $P_2$, of the antenna radiating into free space but shielded to prevent as nearly as possible spurious reflections, was measured. The modified reflection coefficients $P_2'$ were then measured with each of three hemispherical shells of radii 13, 14 and 15 inches centered on the antenna. The modified reflection coefficient need be measured for only three positions of the reflecting surface since three points determine a circle. However, additional hemispheres and measurements would provide an average circle of much more practical accuracy.

Table I represents the results of the measurements taken on the scimitar antenna. These results were derived in the following manner: Since $P_2'$ and $P_2$ are both calculated quantities taken from prime measurements, $P_2$ being calculated as a parameter to verify the theory; a plot of $P_2'-P_2$ in the complex plane will produce a circle. This circle will have a radius of $|N_1|$, given by Equation 17, with center at C, given by Equation 18. Since Equation 17 is completely real, it may be solved simultaneously with Equation 18. By equating the moduli of both sides of the resulting vector equations, $|T|$ and $|P_1|$ may be determined. With $|T|$ and $|P_2|$ known, $|N_2|$ can be computed from Equation 4. Since the theory of this development $|P_1|=|P_2|$, the proximity of the experimentally determined value of $|P_1|$ to the measured value of $|P_2|$ verifies the theory. When the value of $|P_1|$ is calculated from the experimental results, the value of $|N_2|$ is fixed, since these quantities are interdependent. However, the calculation of $|N_2|$ provides a different form of comparing the bilateral properties of the antenna and is therefore furnished in Table I.

*Table I*

| $f$ (mc.) | $|N_1|$ | $|N_2|$ | $|P_1|$ | $|P_2|$ | $\lambda$ (cm.) |
| --- | --- | --- | --- | --- | --- |
| 2,000 | .966 | .954 | .227 | .209 | 15.11 |
| 2,100 | .950 | .957 | .158 | .145 | 14.63 |
| 2,200 | .926 | .942 | .113 | .159 | 13.75 |
| 2,300 | .960 | .950 | .146 | .101 | 13.16 |
| 2,400 | .950 | .953 | .029 | .059 | 12.30 |
| 2,500 | .940 | .935 | .071 | .085 | 12.03 |
| 2,600 | .960 | .060 | .131 | .130 | 11.56 |

FIGURE 5 illustrates a typical plot of $P_2'-P_2$ in the complex plane for a frequency of 2600 mc. The radius $|R|=|N_1|$ and the magnitude of the center vector $$|C|=|P_1|\cdot|N_1|$$

are as indicated on the plot.

The wavelength in the transmission line, the VSWR, and the position of a standing wave minimum with the antenna radiating into free space, were determined as, respectively, 11.56 cm., 1.30 and 132.7. The standing wave indicator 7 was used in the conventional manner to determine the VSWR since the value is small. Since the scale markings on the Hewlett-Packard slab line used are in millimeters, all listed scale readings are in millimeters and relative readings only.

The VSWR and the position of a minimum of the standing wave were determined with each of the hemispherical shells covering the antenna. To determine the VSWR and the position of a minimum, the double-minimum method was used. The position of the double power points, $2p_{min}$, on each side of the standing wave minimum were noted. $P_{min}$ in this case represents the zero power level and $2p_{min}$ represents the three db power points. The increment of distance $l$, between the power points, determines the VSWR when substituted in the formula:

$$VSWR=\frac{\lambda}{\pi l} \quad (22)$$

The mean distance between the double power points represents the position of a standing wave minimum. The recorded values were:

| | Reading No. 1 | Reading No. 2 | Reading No. 3 |
| --- | --- | --- | --- |
| Shell No. 1 | *135.2<br>*134.6 | 135.2<br>134.6 | 135.0<br>134.2 |
| $l$ | *.6 | .6 | .8 |
| Minimum | *134.9 | | |
| Shell No. 2 | 154.8<br>153.8 | *155.1<br>*154.1 | 155.0<br>153.9 |
| $l$ | 1.0 | *1.0 | 1.1 |
| Minimum | | *154.6 | |
| Shell No. 3 | *131.8<br>*131.8 | 131.8<br>131.1 | 131.7<br>131.0 |
| $l$ | *.7 | .7 | .7 |
| Minimum | *131.45 | | |

NOTE.—The mean values selected are indicated by the asterisks (*).

The antenna was disconnected from the slotted line and a short-circuiting termination was applied. The position of a minimum value of the standing wave was noted as Short$_{min}$ 130.9. This completed the measurements for the frequency 2600 mc. and computations were begun.

The VSWR for each shell is computed from Equation 22 and the results were:

VSWR Shell No. 1 _____ 61.3
VSWR Shell No. 2 _____ 36.8
VSWR Shell No. 3 _____ 52.6

The value of $d$ for Equation 21 is computed by determining the distance the minimum value of the standing wave has moved toward the signal generator from its position at Short$_{min}$. The values found were:

For Shell No. 1, $d=4.0$; for Shell No. 2, $d=23.7$;
For Shell No. 3, $d=0.55$; and for No Shell, $d=1.8$.

$P_2'$ and $P_2$ are calculated from Equation 21 and converted to rectangular coordinates as:

$P_2$ No Shell$=.130\angle 191.2°=-.130-j.0026$
$P_2'$ Shell No. 1$=.968\angle 204.9°=-.878-j.408$
$P_2'$ Shell No. 2$=.947\angle 326.0°=.785-j.529$
$P_2'$ Shell No. 3$=.963\angle 183.4°=-.961-j.057$ $P_2$ is subtracted from each value of $P_2'$ as follows:

$P_2'$ Shell No. 1$-P_2=-.748-j.405$
$P_2'$ Shell No. 2$-P_2=.915-j.526$
$P_2'$ Shell No. 3$-P_2=-.830-j.054$ and the resultant values are plotted in the complex plane as in FIGURE 5. From the FIGURE 5 the measured radius, i.e. the antenna's efficiency at the frequency of 2600 mc., is .960 and the measured magnitude of the center vector is .126.

As a verification of the theory $|P_1|$ is computed from the relation $$|P_1|=\frac{|C|}{|N_1|} \quad (23)$$

which is derived by equating the moduli of the simultaneous solution of Equations 17 and 18.

$$|P_1|=\frac{.126}{.960}=.131$$

The efficiency $|N_2|$ is calculated from the relation $$|N_2|=|N_1|\left(\frac{1-|P_1|^2}{1-|P_2|^2}\right) \quad (24)$$

This expression is obtained by substituting $$|T^2| = |N_1|(1 - |P_1|^2)$$

into Equation 4. $|N_2|$ is computed to be .960. Therefore, the theory is verified at 2600 mc. since $$|P_1| = .131 \quad |P_2| = .130$$

CONCLUSION

The novel method of measuring antenna efficiency is substantiated by the above experimental results on a typical linearly polarized antenna. The maximum variation between $|N_1|$ and $|N_2|$, the receiving efficiency and the transmitting efficiency, was 1.6 percent at 2200 mc. There was no perceptible variation at 2600 mc.

The measured efficiency of 95 percent represents the minimum efficiency of the antenna inasmuch as losses in the measuring system and in radiation focusing were assumed negligible. It is significant that no antennas of known efficiency are available for comparison with the determination of the novel method. If an antenna of known efficiency can be secured, the measuring apparatus could be calibrated and future measurements adjusted for expected inherent losses.

The method is not intended to be limited to the specific antenna used in the experiment. The scimitar antenna was chosen as the experiment example solely for its representative characteristics. The method of this invention is applicable to the efficiency measurement of all linearly polarized antennas.

We claim:

1. A method for determining the efficiency of a small linearly polarized antenna comprising: energizing the antenna through a transmission line; determining from measurements on said transmission line the reflection coefficient when the antenna is radiating into free space and the modified reflection coefficient for each of three totally reflecting surfaces centered on the said antenna; determining the coordinates of three points in the complex plane as the difference of each of the said three modified reflection coefficients and said reflection coefficient; said three points producing a circular locus in the complex plane; and determining the radius of the said circle defined by the three points, wherein said radius is equal to the efficiency of the antenna.

2. A method for determining the efficiency of a small linearly polarized antenna comprising: energizing the antenna through a transmission line; determining from measurements on said transmission line the voltage standing wave ratio and the distance from the load to the minimum value of standing wave for the condition in which the antenna is radiating into free space and for each of three conditions in which totally reflecting surfaces of different radii are positioned over the antenna; computing the reflection coefficient for the said free space condition and the modified reflection coefficient for each of the said three conditions from the formula:

$$P_2' = \frac{\text{VSWR} - 1}{\text{VSWR} + 1} \bigg/ \frac{4\pi d}{\lambda} \pm \pi$$

where VSWR is the voltage standing wave ratio, $d$ is the distance from the load to the minimum value of the standing wave and $\lambda$ is the wavelength, determining the coordinates of three points in the complex plane as the difference of each of the said three modified reflection coefficients and said reflection coefficient; said three points producing a circular locus in the complex plane; and determining the radius of the said circle defined by the three points, wherein said radius is equal to the efficiency of the antenna.

No references cited.